United States Patent [19]

Paulish et al.

[11] 4,287,592
[45] Sep. 1, 1981

[54] METHOD AND APPARATUS FOR INTERFACING STATIONS IN A MULTILOOP COMMUNICATIONS SYSTEM

[75] Inventors: Daniel J. Paulish, Downingtown; Albert J. Meyerhoff, Wynnewood; George R. Nickett, Warrington, all of Pa.

[73] Assignee: Burroughs Corporation, Detroit, Mich.

[21] Appl. No.: 41,870

[22] Filed: May 23, 1979

[51] Int. Cl.³ .............................................. G08B 5/00
[52] U.S. Cl. ..................................... 370/88; 370/92; 370/94
[58] Field of Search ............................ 370/88, 92, 94

[56] References Cited

U.S. PATENT DOCUMENTS

| Re. 28,811 | 5/1976 | Pierce | 370/88 |
|---|---|---|---|
| 3,742,144 | 6/1973 | Brandenburg | 370/88 |
| 3,890,471 | 6/1975 | Hachenburg | 370/88 |
| 4,074,232 | 2/1978 | Otomo | 370/60 |

Primary Examiner—David L. Stewart
Attorney, Agent, or Firm—Mark T. Starr

[57] ABSTRACT

A multiloop communications system and a method of routing data between stations is disclosed. The communications system has a plurality of interconnected communications loops, each of the loops including a ring-connected set of nodes providing data flow unidirectionally from one node to the next, each of the nodes being capable of passing data through itself along its loop, extracting data from its loop or injecting data into its loop. A first subset of each loop's set of nodes are local nodes which interface a station to its respective loop. A second subset of each loop's set of nodes are gateway nodes which interface to a gateway node of another of the loops. Each of the stations has a logical address unique within the system and each of the nodes has a functional address unique within each node's respective loop. A first station transmits data to a second station via the first station's local node, the local node forming a packet including the functional address of a node providing a route to the second station and further including the logical address of the second station. If the path to the second station includes a transfer to another loop, the gateway node on the transmitting loop transfers the logical address of the second station to the gateway node of the receiving loop. The gateway node of the receiving loop forms a new packet of data utilizing the logical address of the second station and a table which specifies the functional address of the route to be taken to second station. The system and method additionally provides for alternate routing in the case when the most direct path between the transmitting and receiving stations is inoperative.

41 Claims, 13 Drawing Figures

TIME IN TIME UNITS T
ADDRESS FIELD

TIME IN TIME UNITS T
INFORMATION FIELD

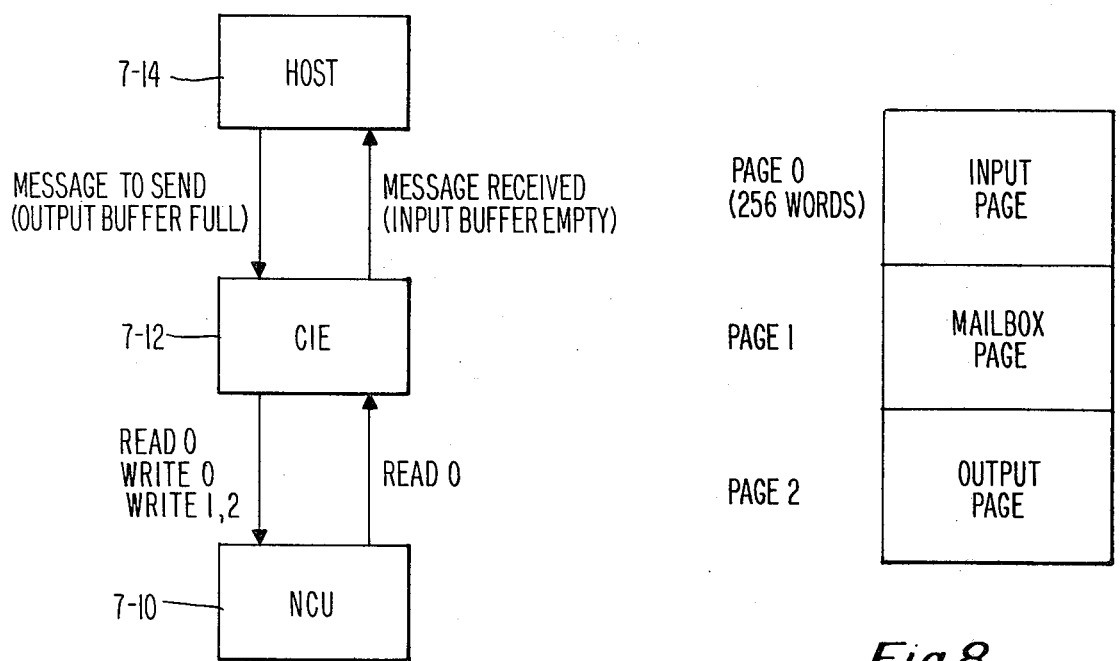

METHOD AND APPARATUS FOR INTERFACING STATIONS IN A MULTILOOP COMMUNICATIONS SYSTEM

BACKGROUND OF THE INVENTION

The present invention relates in general to a system and method for communicating data between distributed stations. More particularly, the present invention relates to an interconnected multiloop communications system that includes an address directed protocol for routing messages between stations that are coupled to the system.

Today, there is an accelerating trend in the data processing industry toward distributed processing. All jobs that require interactive communications between users and the system are ideally suited for distributed processing, which moves critical data and processor power closer to the user. With distributed processing, changes in one area of a system can be made without impacting the user or the rest of the system.

It is a general object of the present invention to provide a multiloop communications system which facilitates the transfer of data between distributed stations or processors.

It is an additional object of the present invention to provide a system and method of routing data between distributed processors interconnected in a single system.

It is a further object of the present invention to provide an address directed protocol for use in routing data between host processors attached to a multiloop communications system.

These and other objects, features and advantages of the present invention will become more apparent from the detailed description of the preferred embodiment when read in conjunction with the drawings.

SUMMARY OF THE INVENTION

According to the invention, the communications system includes a plurality of interconnected communications loops, each of the loops including a ring-connected set of nodes providing data flow unidirectionally from one node to the next, each of the nodes being capable of passing data through itself along its loop, extracting data from its loop or injecting data into its loop.

A first subset of each loop's set of nodes are local nodes which interface a station (which in the preferred embodiment is a host computer) to its respective loop. A second subset of each loop's set of nodes are gateway nodes which interface to a gateway node of another of said plurality of loops.

Each station has associated with it a logical address unique within the communications system. Each node has associated with it a functional address unique within that node's respective loop.

When a first station desires to transmit data to a second station configured somewhere in the system, the first system need not know the actual location of the second station. The first station transfers to its connected local node the logical address of the second station and the data to be sent. The local node connected to the first station uses a table to obtain the functional address corresponding to the logical address of the second station, and uses this functional address to form a packet consisting of alternating address and information fields. The functional address obtained from the table is that of the local node connecting the second station to the loop if the second station is on the same loop as the first station or the functional address of a gateway node which provides a partial or complete route to the loop on which the second station is connected. The information fields in the packet formed include the logical addresses of the first and second stations and the data to be sent.

The packet formed is transmitted onto the first station's loop. As a node on the loop receives the packet, it compares the received packet's address field with its associated functional address. If they are unequal, the receiving node retransmits the packet onto the loop. If equal and the receiving node is a local node, the receiving node transfers the data in the packet to its connected (second) station. If equal and the receiving node is a gateway node, the receiving node transfers the information fields of the packet to the connected gateway node of a second loop. The connected gateway node uses the received information field that specifies the logical address of the second station and its logical address/functional address conversion table to find the functional address of the node providing a route to the second station. The connected gateway node forms a packet identical to the original packet, except that the address fields specify the functional address obtained from the connected gateway node's table. The connected gateway node transmits the newly formed packet onto its loop. Operation of the system from here on is identical to that for the originally transmitted packet and continues until the local node connecting the second station to the system is reached.

The present invention includes provision for utilizing alternate routes to the second station if one of the primary routes to the second station is inoperative. Alternate routing is implemented by a transmitting node using the alternate functional address as specified in its logical address/functional address conversion table and setting one of the formed packet's information fields to specify that alternate routing was used.

The present system also provides for the second station acknowledging receipt of the packet from the first station. Upon receipt of a packet from the first station, the local node connecting the second station to the system forms and transmits a packet onto its loop. The address fields of this acknowledgment packet utilize the functional address specified in the conversion table corresponding to the logical address of the first station as provided in one of the information fields of the received packet. Transmission of the acknowledgment packet back to the first station is analogous with that of the original transmission. If alternate routing was used in the originally transmitted packet, the acknowledgment packet is also transmitted using alternate routing.

BRIEF DESCRIPTION OF THE DRAWINGS

FIG. 7 shows the system data flow between a host processor, the control and interface equipment (CIE), and the nodal control unit (NCU) of the preferred embodiment of the present invention.

FIG. 8 shows the common NCU-CIE access pages in a node's data memory.

FIG. 9 shows the contents of the mail box page of FIG. 8.

FIG. 11 shows the operation of the nodal control unit in terms of the states the NCU may be in.

DESCRIPTION OF THE PREFERRED EMBODIMENT

A communications loop is a closed, ring-connected set of nodes providing data flow unidirectionallly from one node to the next. The basic mechanism of a communications loop is a bus, in the form of a ring, in which data flows in one circular direction. Ring interfaces interact with this ring at points called nodes. A node can pass data through itself along the ring, extract data from the ring, or inject data into the ring.

The preferred embodiment of the present invention is implemented with three interconnected communications loop consisting of nodes which are made up of two parallel processing Burroughs mini-D (B7*) machines, such as that disclosed in U.S. Pat. No. 3,878,514, issued Apr. 15, 1975, and U.S. Pat. Nos. 3,972,024 and 3,972,025, both of which issued July 27, 1976. The nodes are of two types: local nodes which interface a host computer to the loop, and gateway nodes which interface to another gateway node in order to implement loop to loop transfers.

Figure 1:
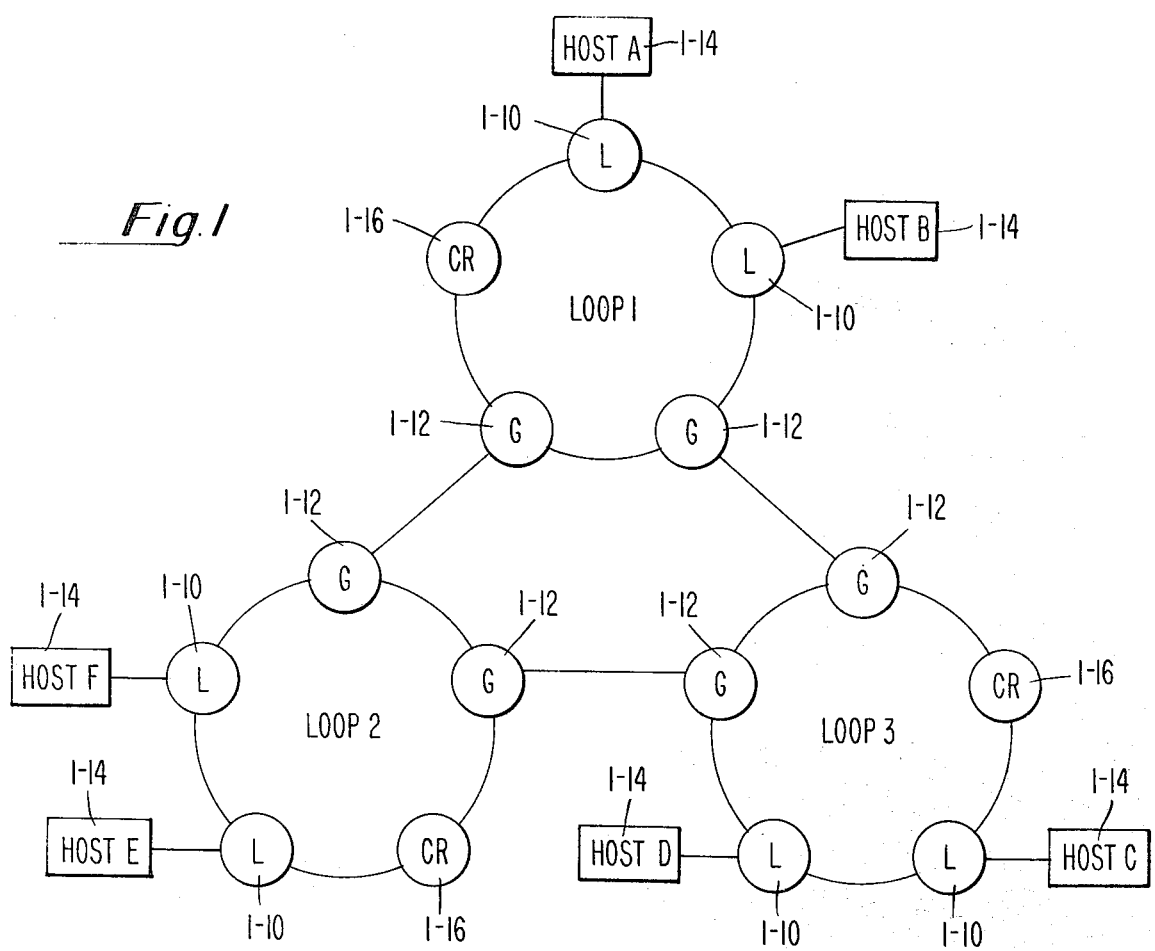
FIG. 1 is a generalized functional block diagram of the communications system of the present invention.

A generalized version of the multiloop communications system of the preferred embodiment of the present invention is shown in FIG. 1. There are three communications loops, each having two local nodes L 1-10 and two gateway nodes G 1-12. Local nodes L 1-10 are associated with host computer 1-14 attachment to a loop and gateway nodes G 1-12 are involved in loop-to-loop attachment.

Figure 6:
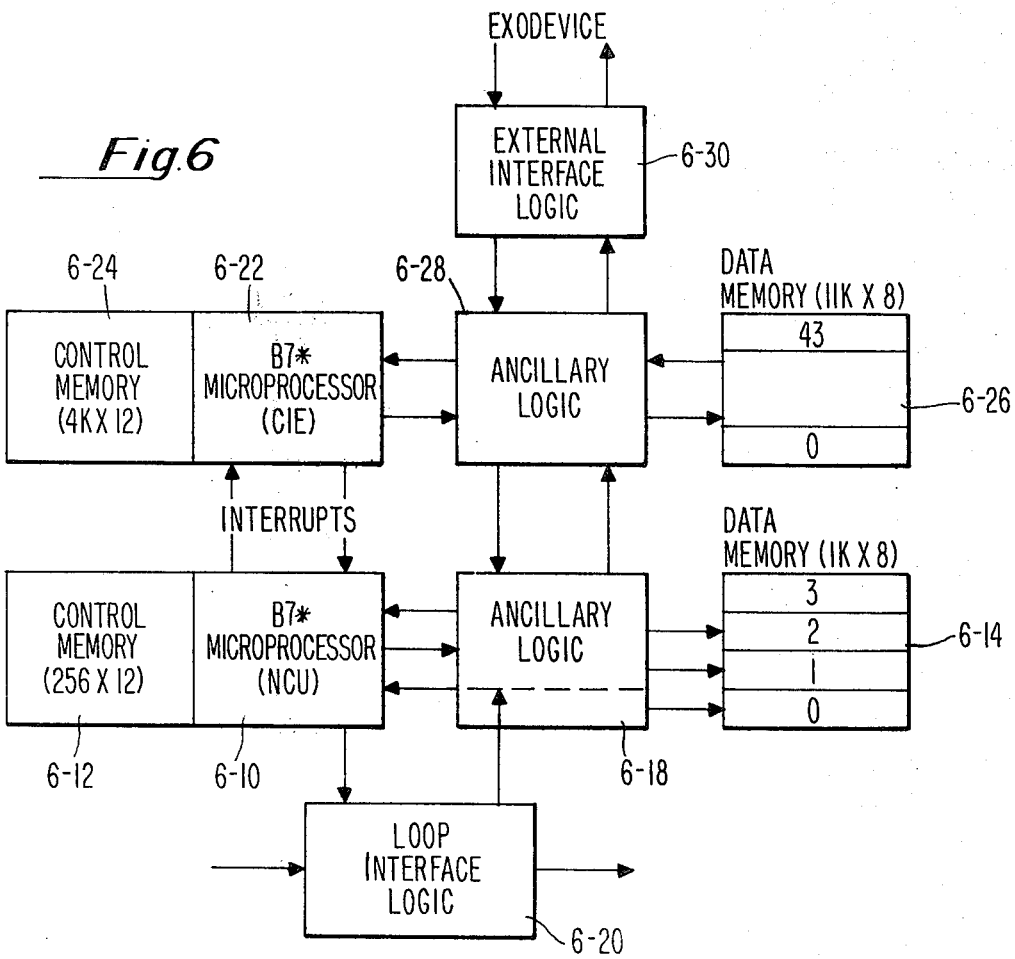
FIG. 6 is a functional block diagram of the logical components of the nodes used in the preferred embodiment of the present invention.

Referring briefly to FIG. 6, all nodes are the same, with each having a line interface unit (LIU) 6-20 and a microprocessor (mini-D) nodal control unit (NCU) 6-10. The LIU 6-20 and the NCU 6-10 are considered part of the node. Each node is attached to another processor which controls the node and acts as an interface for external equipment. This second processor is called the control and interface equipment (CIE) 6-22. Each CIE 6-22 is essentially the same as any other CIE 6-22 except for microprogram. For L-nodes 1-10, the CIE 6-22 interfaces with external equipment; for G-nodes 1-12, the CIE 6-22 interfaces with another CIE 6-22. Another mini-D (B 7*) microprocessor is used as the CIE 6-22. Each node can pass data through its LIU 6-20 along its loop, extract data from its loop for storage in the NCU 6-10, or take data from the NCU 6-10 and inject it into the stream of data circulating in its loop. The CIE 6-22 gives general directions to the NCU 6-10 and it may take data from or give data to the NCU 6-10.

The NCU 6-10 controls the operation of the node and is synchronous with the LIU 6-20 and the data stream. The CIE 6-22 usually operates asynchronously and will be at a higher clock rate. Each loop has a clock-retimer (C-R) 1-16 which controls the data clock frequency and restandardizes the time slots.

The data stream is a bit-serial set of frames. Each frame is 20T in duration and contains 20 time slots, each of which is T in duration. Each 20T frame is divided into two fields, an address field and an information field, each 10T in duration. T may be any desired duration over a wide range starting at 1 $\mu$s. There is always an address field of 10T duration followed by an information field of 10T duration. The first two time slots of each field provide synchronization and give the type of field; the last eight time slots provide a byte of information called the address word and the information word respectively.

Figure 2A:
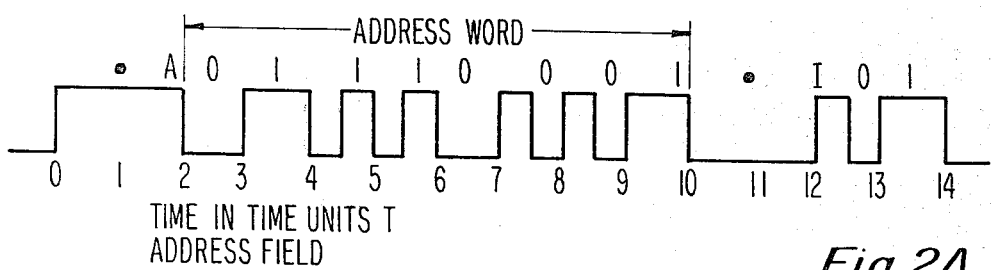
FIGS. 2A and 2B show the format of the address and information fields used to transmit data on a loop.
Figure 2B:
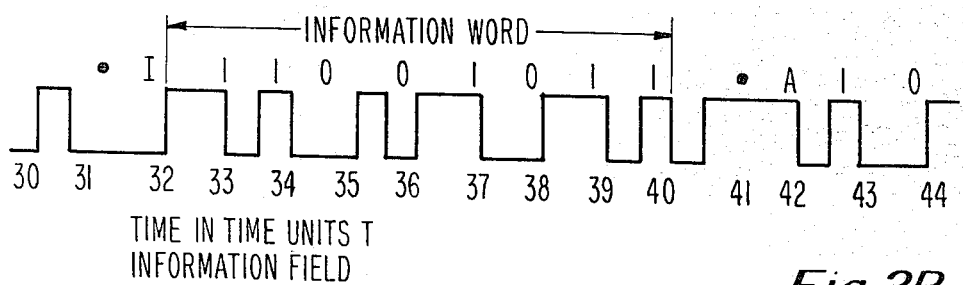

Typical address and information fields are shown in FIG. 2. A transition occurs at each T start to provide clocks except at the synchronization points (shown as a dot at the 1T point in FIG. 2A and at the 31 T point in FIG. 2B). A mark after the dot means address (A in FIG. 2A); a space after the dot means information (I in FIG. 2B). In the address and information words that follow A and I, transitions always occur each T. A mark after each transition means one; a space means zero. The maximum frame rate therefore, is 50,000 per second based on a T of 1 $\mu$s. The node can write only once in two frames because of a delay caused by address and data insertion. Therefore, the effective loop capacity is 25,000 characters per second.

A node has three modes of operation, namely: delay, read and write. The delay mode involves no NCU 6-10 control. In this mode the node supplies a 10T delay and reforms the pulses so that the node acts as a delay repeater. When the NCU 6-10 requests a read, it sets an 8-bit address in the LIU 6-20 address register and places the LIU 6-20 in read mode. The NCU 6-10 then inhibits its own clock and thereby shuts off. The LIU 6-20 senses address fields in the data stream. When an address word does not match the node address, the node acts as a delay repeater. When an address word matches the node address, the LIU 6-20 sets the address word to zero and removes the clock inhibit of the NCU 6-10 so that the NCU 6-10 starts at the proper time for the data word to be read into its external input register. When the NCU 6-10 requests a write, it sets the 8-bit address register of the LIU 6-20 and places the LIU 6-20 in the write mode. The NCU 6-10 then inhibits its own clock and shuts itself off. The LIU 6-20 places its address in the address word and removes the clock inhibit of the NCU 6-10 so that the NCU 6-10 starts at the proper time for the content of an output register to be inserted into the information word. When the write is complete a new address may be placed in the address register of the LIU 6-20. The NCU 6-10 then enters the read mode. The CIE processor 6-22 controls the NCU 6-10 by instructing it to go into a read or write mode and thus controls data transfer between itself and the NCU 6-10.

A packet is a sequence of alternating address and information fields consisting of at most, 256 frames. A message consists of an ordered set of packets.

The loop protocol of the present invention is implemented by protocol type information words which are written into the beginning and end information words, (i.e. header and trailer), of a packet. These protocol type information words (protocol characters) are actually data patterns which are interpreted by the node, and are not to be confused with the address words which make up the address fields that precede every information field. The existing protocol characters and their location within a packet are given in Table 1.

TABLE 1

| | Protocol Characters |
|---|---|
| D1 | Destination Logical ID |
| D2 | Source Logical ID |
| D3 | Control character |
| D4 | Broadcast Character |
| D5 | Packet Sequence Number |
| D6 | Message Sequence Number |
| D7 | Packet information which is ignored by node and is destined for host or another CIE |
| . | |
| . | |
| DN-2 | |
| DN-1 | End-of-Packet Character (EOP) |
| DN | Longitudinal Parity Check (LPC) |

In Table 1, N is the overall packet length equal to, at most, 256 characters. Characters D1-D6, DN-1 and DN are the protocol characters and D7 to DN-2 are the packet information characters. The packet information characters may use any desired code, such as ASCII, EBCDIC, etc.

Figure 3:
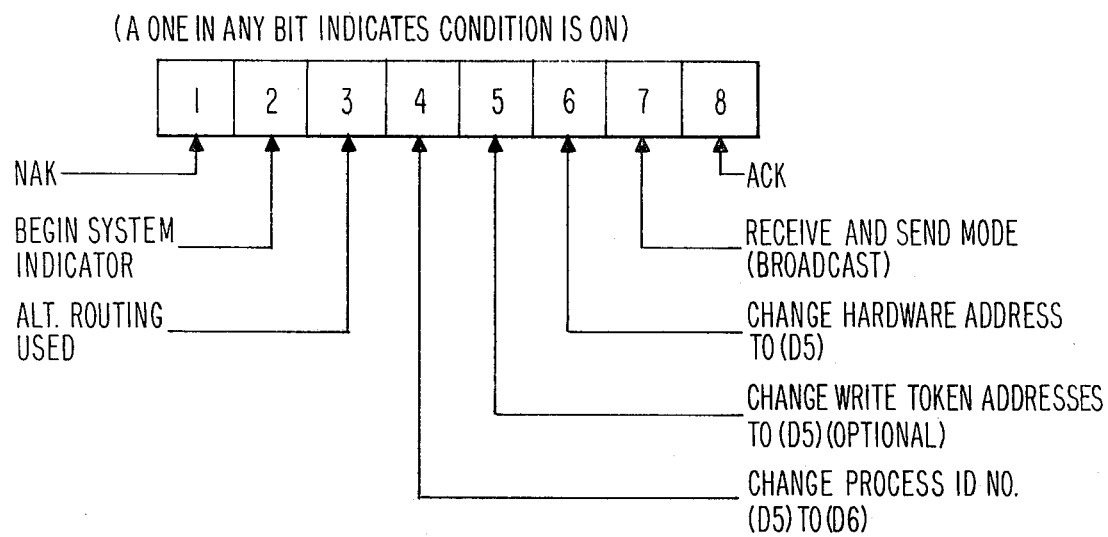
FIG. 3 defines the control functions which may be specified in a transmitted packet.

D1 can handle 256 unique logical ID's. However, several of these logical ID's are reserved. Thus, the value 255 is reserved for the "write token" or free packet which will be described later. A few other logical ID's are reserved for special control purposes such as broadcast. The value zero is not used because it represents the null value. The same remarks apply to D2. D3 is for control purposes as shown in FIG. 3. D4 is used only for broadcast messages wherein a proper broadcast D1 is used and D3 has the value 1 in the 7th bit position. During broadcast, D4 is marked by certain nodes to ensure that each node receives the message once and only once. Broadcast mode will be explained in detail later. D5 assures the assembly of packets into a message through the use of consecutive packet numbers within a message. Similarly, D6 provides a message sequence number to allow for separation of messages from a given logical ID.

The control word D3 provides for the implementation of control packets corresponding to functions defined in FIG. 3. Since they may consist of only a small number of control-oriented characters, these control packets represent only a small overhead in loop traffic. For example, a NAK or ACK type control packet may consist of only eight characters:

| ACK or NAK packet | $\triangleq$ | { | D1 - Destination logical ID<br>D2 - Source logical ID<br>D3 - Control-ACK or NAK<br>D4 - Broadcast = 0<br>D5 - Packet sequence number<br>D6 - Message sequence number<br>D7 - EOP<br>D8 - LPC |
|---|---|---|---|

Another very short control packet is the write token (WT) that consists of only two characters:

| WT | $\triangleq$ | { | D1 - EOP<br>D2 - LPC |
|---|---|---|---|

A valid WT LPC will equal the address word to detect the occurrence of erroneous WT's generated by noise on the loop.

The write token is used to achieve a rapid type of implicit polling which will be described below. DN-1 is the end-of-packet word which is equal to eight consecutive ones. This bit pattern is used because it is a unique word that does not exist as a transmitted character in any of the usual transmission codes and because it is an existing mini-D condition test (i.e., the all bits true test ABT) which is used to implement variable length packet sizes for the multiloop system of the present invention. The final information word is used for a longitudinal parity check which is an XOR operation performed on every information word of the packet, and it is used to determine whether an ACK or NAK type response should be sent to the packet originator.

The preferred embodiment of the present invention includes an address directed protocol for implementing the multiloop system. Each node on a loop has a register set to a unique read or functional address within the loop; each node has the ability to sense address fields, ignoring those fields that are not equal to its read address, and reading into its memory the information word following an address field that is equal to its read address. A node has permission to write a packet onto the loop only when it has received the write token (WT) which has a logical ID equal to 255, i.e., an all ONES bit pattern. The WT is sent from node to node around the loop. A node reads the WT addressed to it, writes a packet if it has anything to write, and then sends on the WT to the next node on the loop using the read address of that node. The orbiting WT defines an implicit polling scheme which allows a group of M nodes on the loop to write information directly to a destination without interfering with each other. This implicit polling scheme is much faster than an explicit polling scheme in which handshaking messages are passed back and forth causing a large overhead setup time. If worst case conditions are assumed (in which everyone on the loop desires to send a packet at once) the time it takes for a write token to travel completely around the loop or the maximum amount of time a node must wait before another packet can be written is given by:

$$T_{WT} = (MP/C_L)$$

where M is the number of nodes on the loop, P is the maximum packet size given in characters, and $C_L$ is the loop capacity given in characters/sec. Considering that the average WT cycle time will be less than the maximum obtained assuming worst case conditions, the WT cycle time will be between the limits, $$(MK/C_L) \leq T_{WT} \leq (MP/C_L)$$

where K is the number of characters comprising a WT adjusted to reflect any processing time that the nodes takes to recognize that it has received a WT.

In the preferred embodiment of the present invention, if it is assumed that M=4, P=256 characters, and $C_L$=25,000 characters/second, then under worst case conditions, the WT cycle time will equal approximately 41 milliseconds.

Since the worst case WT orbit time for a loop is known, nodal software can provide for the creation of a new WT if one is not received within $MP/C_L$ seconds. Furthermore, each node that has the WT has the ability to destructively write onto any address and information field, thus erasing any invalid characters that may circulate the loop due to bit inversions or packets sent to inoperative nodes. Thus the protocol guarantees that the loop can never become clogged due to unreceived packets or a lost WT.

The address directed protocol provides near instantaneous communication between two nodes on a loop. Since intermediate nodes ignore packets that do not have address fields corresponding to their read addresses, a direct line connection is made between a node possessing the WT and its destination node on the same loop.

In the preferred embodiment of the present invention, the address directed protocol is implemented in the nodes by means of a table look up. The table is stored in a 256-word page in each nodal data memory, and it maps logical ID's (LID) to nodal functional addresses (FAD). For each data memory location on the conversion page corresponding to a particular logical ID, there is an 8-bit representation of the functional address of the node associated with that logical ID. A node wishing to send a message to logical ID of value X sends each information word of the message preceded by an address word having the value contained in location X of the node's conversion (LID/FAD) table page. Rapid reconfiguration of the network is possible using this method merely by modifying this page in each node's memory.

Figure 4:
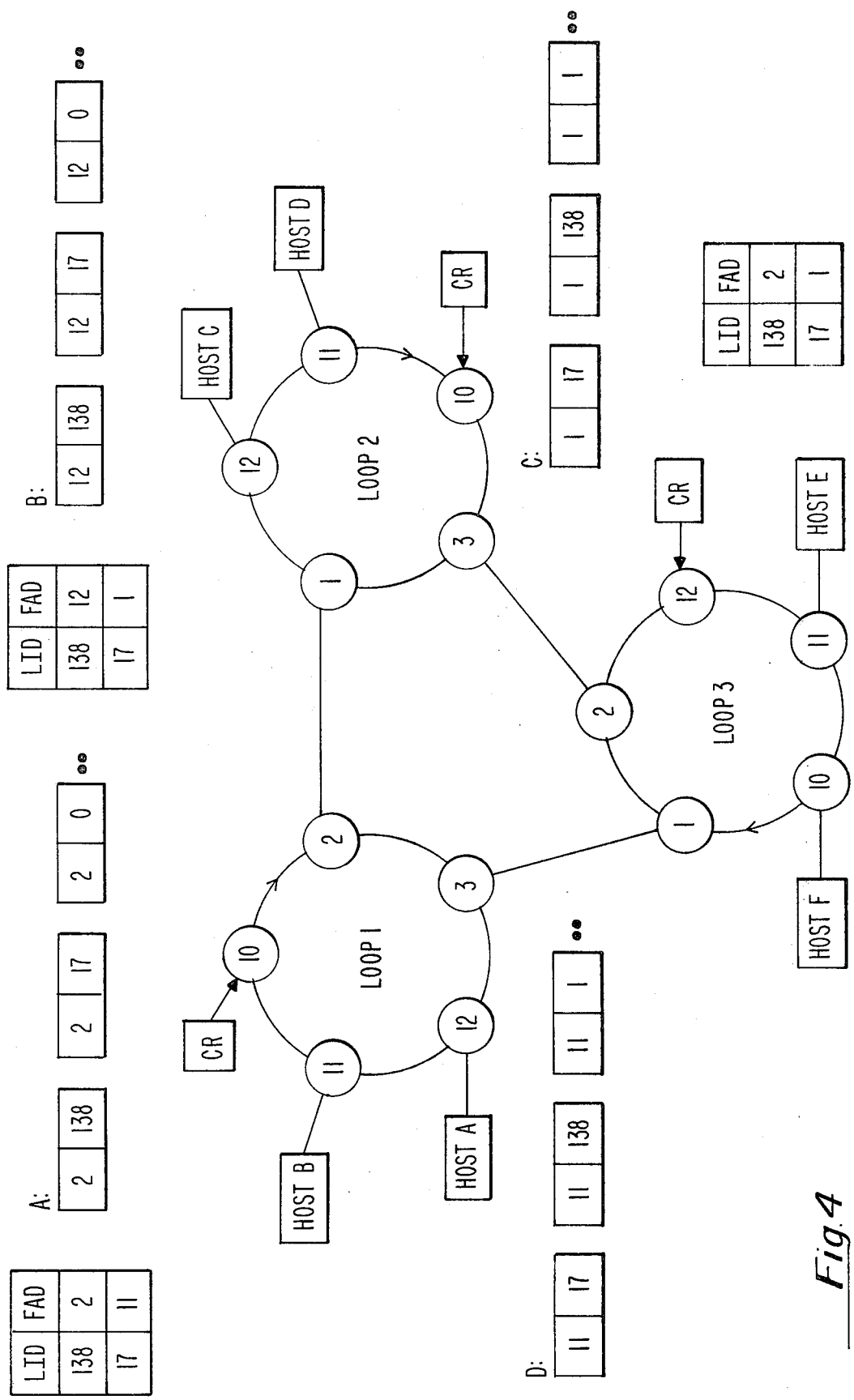
FIG. 4 shows an example of the method of addressing used in the preferred embodiment of the present invention.

FIG. 4 illustrates an example of the method of addressing utilized in the multiple loop system of the present invention. Three loops are shown connected via gateway nodes. Gateway node 2 of loop 1 connects to gateway node 1 of loop 2 via a hard wire connection independent of the loops. Similarly, loop 1 connects to loop 3 and loop 3 connects to loop 2 via gateways. Each loop is independent of the other loops.

The C-R symbol on each loop is a clock-retimer which is used only when loop nodes are not physically contained within a single cabinet. Thus, the C-R function can be ignored for the moment.

The small circles are nodes and the numbers within the circles represent the "functional" (or read) address of the node. Note that gateway node functional addresses equal the loop number of the loop to which they interface. The functional address is the local address unique within the loop. In addition, each node has a "logical" identifier unique within the multiloop system. The protocol which relates these two entities is called the "address directed protocol" and is described below.

Suppose now that host processor B wishes to send a packet to logical ID 138 which resides on host C. Host B uses its own logical ID 17 as the source logical ID which will be used as the destination logical ID for the return ACK or NAK type packet.

Host B supplies the information words to the CIE which determines the functional write address for logical ID 138 from its LID/FAD table, and sends a packet onto the loop having the form of packet A when it receives a WT. Gateway Node 2 on Loop 1 reads the packet destined to it and sends the information words across the interface to Loop 2. Gateway Node 1 of Loop 2 then looks in its LID/FAD table and sends packet B onto the loop. Node 12 of loop 2 reads the packet and determines whether the LPC (check) character checks or not. Assuming the LPC does check, the CIE delivers information words to Host C and sends an ACK type packet having the form of packet C to logical ID 17. The packet is read by Gateway Node 1 of Loop 2 which transfers the information words to Gateway Node 2 of Loop 1. Finally, packet D is sent on Loop 1 which is read by Node 11 which pairs the ACK to a packet on its outstanding packet list. Note that if the connection between Loop 1 and Loop 2 was inoperable, alternate routing could be used if the CIE connected to Host B sent its packet to Gateway Node 3 of Loop 1 and set D3=32 to indicate alternate routing. The packet would thus reach Loop 2 via the gateway nodes of Loop 3. An originating node can determine whether or not a packet ever reached its destination by waiting for an ACK or NAK within a certain predetermined amount of time. If a NAK is received or there is no response, the originating node may again try to send the packet, possibly by an alternate route. Alternate routing is implemented by changing the address words to the functional address of the other gateway node on the loop, as will be explained below.

The address directed protocol of the present invention possesses attractive features which provide a simple implementation of certain kinds of control messages. For example, various types of broadcast messages may be implemented by assigning a special broadcast logical ID and modifying the control information word (D3) so that the message is placed in the receive and send mode (FIG. 3). A node which receives a message that is in the receive and send mode will retransmit the message to the functional address that is specified in its logical ID (LID) to functional address (FAD) conversion page in the location given by the special logical ID located in information word D1 (Table 1). Different types of broadcasts may be implemented using this method, e.g., network broadcasts, local loop broadcasts, selected host only broadcasts, etc. In a broadcast type packet, information word D4 is used to guarantee that nodes do not receive a message twice and that broadcasts are correctly quenched. The originator of a broadcast will write its functional address in D4 and then quench the broadcast when the packet travels completely around its loop at which time the originator node will recognize its functional address in D4 and not resend the packet. Whenever broadcasts travel from loop to loop via a gateway node, the left-most bit of D4 will be set by that gateway node to indicate to other gateway nodes on the receiving loop not to send the packet across the interface so that nodes do not receive a packet more than once. A gateway node that acts as the originator of a broadcast for its loop will place its functional address in D4 as well as setting the left-most bit and will then quench the broadcast for its loop when a complete circuit of the loop has occurred.

A broadcast type packet may also be used in conjunction with a special node interpreted control message (e.g., modification of logical ID to functional address page, c.f. FIG. 3) to implement rapid network reconfigurations or for creating, destroying and moving logical ID's.

When a link goes down, a routing method is provided in order to avoid the bad link. In the multiloop system of the present invention, the two connectivity feature implies that a node can talk to any other node via an alternate path when the primary path link is down. Each loop has at least two gateway nodes. Alternate routing is implemented in the present invention via the logical ID (LID)/functional address (FAD) conversion tables. A node uses the FAD found in its table at a location (index) equal to the LID as the loop address when sending the packet. It may reach its final destination via other loops. If the destination is correctly reached (i.e., a good LPC), an ACK message is sent back to the originating node. If a NAK is received or a timeout period is exceeded with no response, the message would be retransmitted. After a specified number of retries, alternate routing would be utilized by using the loop address of another gateway node in the loop. By convention, gateway nodes use an FAD or read address equal to the loop number to which they send messages.

Figure 5:
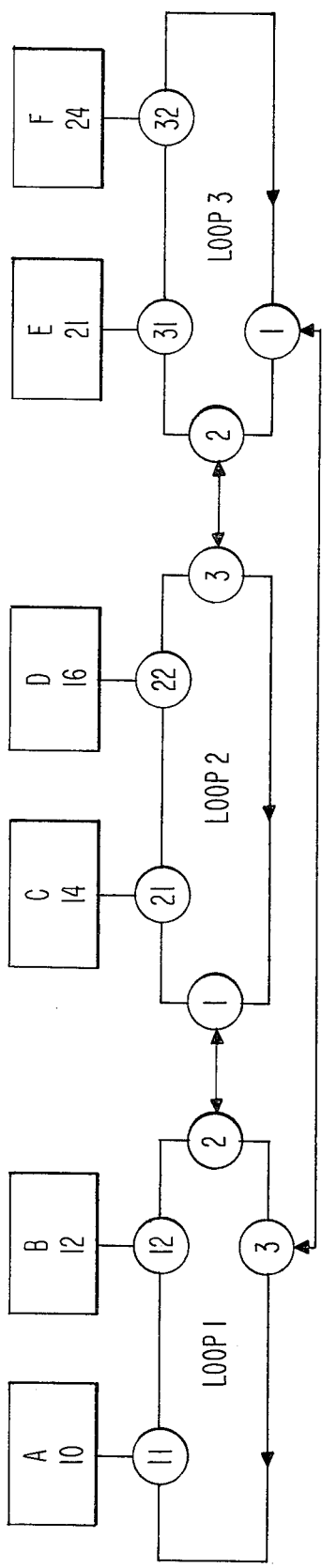
FIG. 5 shows an example of the method of addressing using alternate routing as provided in the preferred embodiment of the present invention.

An example of how alternate routing is implemented in the multiloop architecture of the present invention using indirect addressing is given in FIG. 5. Assume that host processor A on loop 1 wishes to send a message to system process 21. Host A need not know where process 21 resides in the network. Let us assume for the example that process 21 resides on host processor E in loop 3. Host A sends a packet to its CIE with 21 as the destination LID and 10 as its source LID. The CIE looks in its LID/FAD conversion table and formats a packet G using a FAD or loop address equal to 3. The packet G is sent out onto the loop, bypasses nodes 12 and 2 and is read by gateway node 3. Gateway node 3 sends the information words of the packet across the 1-3 link. Gateway node 1 in loop 3 uses its LID/FAD table to format a packet H having loop address 31. The packet H is sent out onto the loop, bypasses node 2 and is read by node 31 which then determines whether the LPC character checks or not. Assuming the LPC character does check, the CIE delivers information words to Process 21 and sends an ACK type packet having the form of packet I out onto the loop using LID 10. The packet I bypasses node 32 and is read by gateway node 1. Gateway node 1 sends the information word part of packet I across the 3-1 link. Gateway 3 in loop 1 uses its LID/FAD table to format a packet J having loop address 11. The packet J is read by node 11 and is linked into the input queue for deliverance to Host A.

If node 11 had not received an ACK message after a specified number of retransmissions, it would utilize alternate routing. It would do this by marking the packet K indicating that alternate routing was used and changing the loop read address (FAD) from 3 to 2. Gateway node 2 in loop 1 would read the packet K and send the information part across the 1-2 link. Gateway node 1 in loop 2 would use a FAD of 3 as determined from its LID/FAD conversion table to form packet L. The packet L would bypass nodes 21 and 22 and be read by gateway node 3. The information words of packet L would be sent across the 2-3 link and gateway node 2 in loop 3 would use a FAD of 31, as determined from its LID/FAD table, to form packet M. The packet M would be read by node 31 which would then determine whether the LPC character checked or not. Assuming the LPC character did check, the CIE would deliver information words to Process 21 and send an ACK type packet of the form of packet N out onto the loop using alternate routing. Gateway node 2 in loop 3 would read the packet N and send the information part across the 2-3 link. Gateway node 3 in loop 2 would use a FAD of 1 as determined from its LID/FAD conversion table to form packet O. Gateway node 1 in loop 2 would read the packet O and send the information part across the 1-2 link. Gateway node 2 in loop 1 would use a FAD of 11 as determined from its LID/FAD conversion table to form packet P. The packet P would bypass gateway node 3 and be read by node 11 and linked into the input queue for deliverence to Host A.

It should be noted that the alternate routing control character is only utilized by the nodes originating a transmission. Thus, when a node sends a packet by an alternate route, it sets the alternate routing control character. However, nodes between the originating node and the destination node which receive the packet do not respond to the alternate routing control character by using the alternate routing entry of their respective LID/FAD table. When the destination node receives the packet, prior to sending an acknowledgment, it checks to see if the alternate routing bit was on in the packet received. If alternate routing was indicated, the destination node uses the alternate address from its LID/FAD table to format an acknowledgment packet to be sent to the packet originator and turns on the alternate routing control character. However, as in the case of the original packet transmitted, nodes receiving a packet indicating ACK and alternate routing, do not respond to such indication by using the alternate routing entry of their LID/FAD table in retransmitting the packet.

Node 11 would also report to one or more network control processors who could remove the 1-3 link from service for repair. This would involve sending special broadcast control packets to loops 1 and 3 so that link 1-3 would not be used. Thus, in loop 1 FAD entries of 3 would be changed to 2, and in loop 3 FAD entries of 1 would be changed to 2.

The above method of indirect addressing can be used for resource allocation such that processes can be moved around the network so that spare or less utilized processors can be utilized. For example, let us say that Host E is to be brought down for service and thus process 21 is to be moved to another processor. Let us say that it is determined (possibly by some bid-quotation scheme) that Host D of loop 2 is to handle process 21. In order to move the process, control packets would be broadcast in each loop to change the LID/FAD tables. In loop 1 the FAD for LID location 21 would be changed from 3 to 2 (ALT would now be 3), in loop 2 the FAD entry would be changed from 3 to 22, and in loop 3 the FAD entry would be changed from 31 to 2 (ALT would be 1).

As previously mentioned, the nodal hardware is configured around two Burroughs B 7* microprocessors and can best be described in terms of two processor-centered segments (FIG. 6). The first segment consists of the Nodal Control Unit (NCU) microprocessor 6-10 and its associated control memory 6-12, data memory 6-14, ancillary logic 6-18 and loop interface logic 6-20. The primary purpose of this segment is to insert packets into the loop and to remove packets (containing an appropriate address) from the loop. Hence, it provides only for control and buffering relative to the communications loop.

The second segment consists of the CIE (Control and Interface Equipment) microprocessor 6-22 and its associated control memory 6-24, data memory 6-26, ancillary logic 6-28, and external interface logic 6-30. This segment provides for overall node control, packet and message handling, traffic control and external device interfacing.

In addition to the nodal hardware of FIG. 6, a clock-retimer element is required for each loop. The specific functions and characteristics of this unit and of the elements of the NCU and CIE segments are described in detail in the following paragraphs.

The Loop Interface element 6-20 contains the necessary cable drivers and receivers for direct loop interface. It includes the circuitry for deriving clock from the data stream and for maintaining frame synchronization relative to the data stream. It contains an address register, loaded by microprocessor 6-10, and associated comparison circuitry to permit recognition of a specific address in an address field. Upon address recognition, the information word is streamed directly into the NCU data memory 6-14, while being monitored by microprocessor 6-10 for an end-of-packet (EOP) character. In the preferred embodiment of the present invention, the loop interface logic 6-20 operates at a 1-MHz clock rate.

The NCU microprocessor 6-10 provides for control of the Loop Interface logic 6-20 and the NCU Data Memory 6-14. That is, it establishes the read or write mode of operation (relative to the loop), sets the Loop Interface address register for a read operation or initiates output for a write operation, controls addressing of the Data Memory 6-14 input and output locations and monitors the input/output stream for the EOP character. It interrupts the CIE microprocessor 6-22 upon completion of the write/read cycle and responds to an interrupt from the CIE microprocessor 6-22 to begin its next write/read cycle.

The NCU microprocessor 6-10 operates from a 1-MHz clock derived by the Loop Interface logic 6-20; hence, it operates in synchronism with the bit stream. Processor operation is bit-serial with 10 clocks (10 $\mu$sec) per instruction or per input/output byte (8 bits). The NCU microprocessor 6-10 has 8-bit data registers, a 12-bit instruction register, and employs 8-bit memory addressing, thereby permitting up to 256 words of control memory 6-12. This memory 6-12 has 12-bit words and is provided in ROM form.

The NCU data memory 6-14 functions as I/O buffering relative to the loop and, in addition, provides a mailbox page for communication with the CIE microprocessor 6-22 and for storing other loop control information. This RAM 6-14 consists of 4 pages, each accommodating 256 8-bit words.

The NCU ancillary logic 6-18 provides for memory addressing and read/write control of the NCU data memory 6-14. That is, it provides memory access and memory control by both the NCU microprocessor 6-10 and (when used with the CIE ancillary logic 6-28) the CIE microprocessor 6-22. It provides for serial/parallel data conversion to permit data transfer among the microprocessor 6-10 (serial), data memory 6-14 (parallel) and the communications loop (serial). It permits the routing of data to/from the microprocessor 6-10 and several destinations (e.g., data memory 6-14 or loop interface logic 6-20). Finally, it permits direct memory-to-memory transfers between NCU and CIE data memories 6-14,26 respectively without processor handling, but under processor initiation.

The CIE microprocessor 6-22 provides for control of the entire node. It communicates with the NCU microprocessor 6-10 via interrupts and via the mailbox page of the NCU data memory 6-14. In this manner, it initiates NCU microprocessor 6-10 operations relating to loop interfacing and it accesses NCU data memory 6-14 I/O pages to transfer data between those pages and the I/O queues of its own data memory 6-26. As mentioned earlier, these inter-memory transfers are accomplished directly (memory-to-memory) in parallel transfer mode. The CIE microprocessor 6-22 determines message type (e.g., single address, multiaddress, acknowledgment, etc), does parity checking, generates ACK/NAK messages, determines alternate routing, controls I/O queues, does message assembly, loads/unloads buffers of the external interface logic 6-30, and maintains status of these buffers.

The CIE microprocessor 6-22 is very similar to the NCU microprocessor 6-10 except that it operates from a 10-MHz clock with 9 clocks per instruction and employs 12-bit memory addressing, thereby permitting up to 4 K words of control memory 6-24. This memory 6-24 has 12-bit words and in the preferred embodiment is an external RAM.

The CIE data memory 6-14 primarily provides storage for assembling and queueing messages (in the form of packets) to/from the communications loop as well as to/from the external device. It also provides for storing user address and routing information and includes work page capability. This RAM 6-26 consists of 44 pages each accommodating 256 8-bit words (i.e., a total of 11 K words).

The CIE ancillary logic 6-28 provides for memory addressing and read/write control of the CIE data memory 6-26; together with the NCU ancillary logic 6-18, it provides for access and control of the NCU data memory 6-14 by the CIE microprocessor 6-22. It also provides serial/parallel data conversion to permit data transfer among the CIE microprocessor 6-22 (serial), data memory 6-26 (parallel) and the external interface logic 6-30 (parallel). It permits the routing of data to/from the microprocessor 6-22 and several destinations (e.g., data memory 6-26, memory address register, interface logic, etc.). Finally, it permits direct memory-to-memory transfers between CIE and NCU data memories 6-26,14 respectively, without processor 6-22 handling, but under processor 6-22 initiation.

The External Interface Logic 6-30 permits interface with an external host computer (not shown) or with another communications loop (not shown). It provides the necessary I/O buffers and controls to allow data transfer to/from the I/O queues of the CIE data memory 6-26 and the external device (host computer or communications loop). Data is transferred between data memory 6-26 and the I/O buffers in the direct parallel transfer mode without processor 6-22 handling, but upon processor 6-22 initiation. Buffer status registers are set by the buffers and are read by the processor 6-22. Flags are set by the buffer and by the external device to control external data transfers. Parallel/serial conversion is provided to permit external data transfers in serial form. Necessary line drivers and receivers are included in the external interface logic 6-30.

A clock-retimer (not shown) is provided for each communications loop. It includes an oscillator to generate the basic loop rate (1 MHz) and the circuitry to establish the previously described loop frame format. The clock-retimer also provides for data regeneration and data resynchronization, thereby compensating for effects relative to signal degradation and propagation time.

The following paragraphs describe the nodal software used to implement the address-directed protocol for the multiloop system of the present invention. As previously discussed, a node consists of two mini-D microprocessors operating in parallel. One of the processors is called the nodal control unit (NCU), and it is used to read and write information onto the loop via a line interface unit (LIU). The second processor, which is called the control and interface equipment (CIE), is responsible for intelligent control of the node and acts as an interface for external equipment which may be a host computer or another CIE. The NCU has an associated 256 12-bit word control memory 6-12, and the CIE has an associated 4 K words of control memory 6-24. Both processors have access to a data memory consisting of 12 K words (bytes of characters of eight bits) which may be viewed as an external device.

The mini-D machines are programmed in microcode (e.g., MDMPL). The CIE processor handles data from both the NCU and host computer. The NCU may interrupt the CIE and vice-versa via the mini-D external (EXT) control line which may be tested by an IF EXT type of condition test. The type and source of data are communicated to the CIE by means of external registers to which the originating processor has access.

The system data flow is illustrated in FIG. 7. The NCU 7-10 interrupts the CIE 7-12 after it has read a packet. The host computer 7-14 (or another CIE) informs the CIE 7-12 when it has a message to send. The CIE 7-12 interrupts the NCU 7-10 and instructs it either to go into the read state to read a packet addressed to it, or to go into the write state to write a broadcast type packet onto the loop or write an output packet onto the loop. The CIE 7-12 interrupts the host 7-14 whenever it receives a message destined for the host. The interrupts labeled "read" or "write" between the NCU 7-10 and CIE 7-12 are shown with numerals "0", "1", or "2". These numerals refer to page addresses in data memory that are shared by the NCU 7-10 and CIE 7-12. The functions assigned to these pages are explained below.

The total nodal data memory consists of 12 K 8-bit words divided into 48 pages of 256 words each (FIG. 6). The first three pages are addressable by both the NCU 7-10 and the CIE 7-12 but disjointly in time. When the NCU 7-10 operates as a nodal controller, the shared memory is the NCU memory; when the NCU is waiting for an EXT interrupt, the CIE 7-12 may control the shared memory.

These three pages are shown in FIG. 8 and are labelled as pages 0, 1, and 2. Page 0 is used as an input buffer for packets received by the node. Page 2 is the output buffer for packets to be sent by the node. Page 1 is the mailbox. Page 0 may also be used as a read-write buffer for packets that are received by the node in a receive/send mode of operation such as that used for broadcast type packets. Page 3 is not used in the preferred embodiment.

Page 1 (the mailbox) has multiple uses. It stores interrupt information to be used by the NCU 7-10, it stores parameters such as the node's read address, and ACK-NAK messages which are to be written to the loop upon receipt of the write token (WT). FIG. 9 shows the content of the mailbox.

When a WT is received, the ACK-NAK packets are sent followed by the content of the output page. The WT is then sent to the next hardware address which is obtained from page 1.

Figure 10:
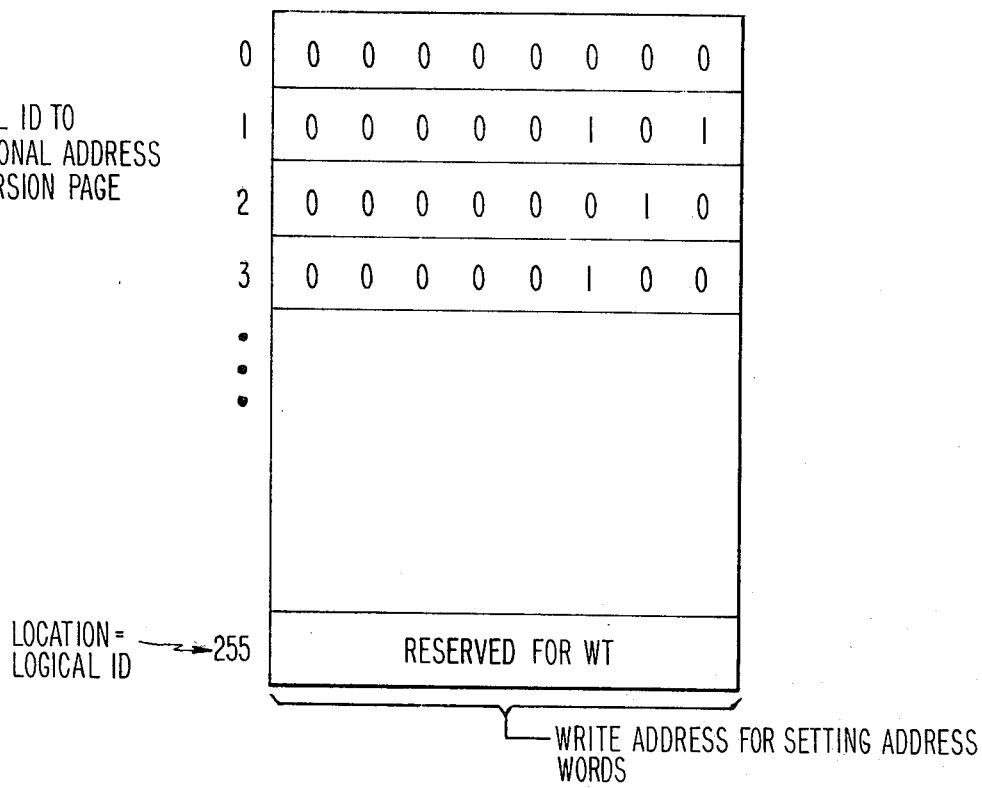
FIG. 10 shows the contents of the logical address-/functional address conversion table.

The remaining 44 pages of data memory are accessed only by the CIE 7-12. Page 0 of the CIE memory is a workpage which is used to store commonly used variables, queue status indicators, and scratchpad areas for storing temporary variables. Page 1 is used as the logical-ID to functional address page which is illustrated in FIG. 10. This page is used to rapidly translate a logical ID to a write address. This will be used by the NCU 7-10 to set its address register to generate the proper address words. The other pages in data memory are used for storing packets in the input to host queue and the output to loop queue. The maximum size of these queues is determined by variables stored on the work page. The queues are described by four variables, two of which are used as pointers to the page at which the packet on the top of queue is located and the first free page, and the other two of which are used to count the total number of packets currently in the queue and the maximum number in order to indicate queue overflow. There is space in the node to store a maximum of 41 packets. Page 2 of the CIE memory is used to build ACK/NAK packets which are moved to the mailbox page when the WT is received.

NCU Software Modules

Figure 11:
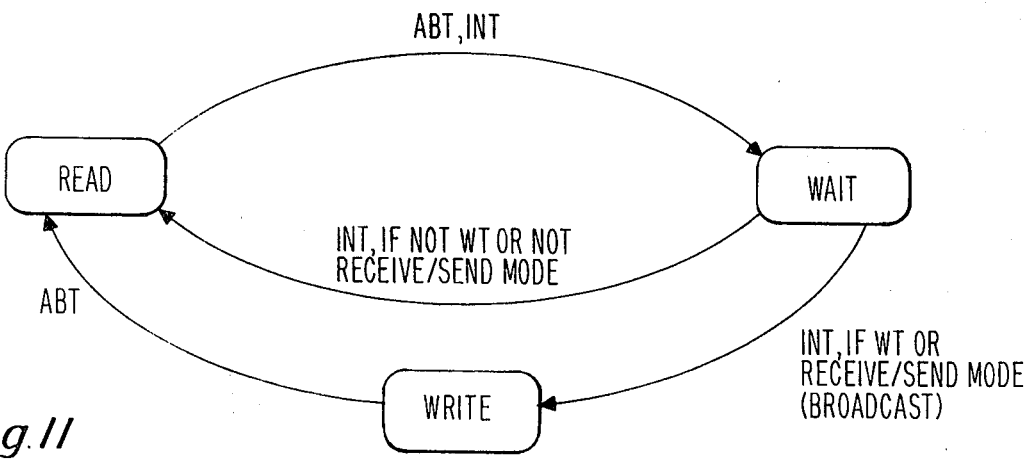

The operation of the NCU 7-10 may best be described by the three-state diagram shown in FIG. 11. The NCU is always in one of three states; namely: read, wait or write. The state transitions and their causes are as follows:

Read-to-wait

This state transition occurs when a packet has been read into the input page of the NCU 7-10 as indicated by the end-of-packet word (EOP). The NCU 7-10 informs the CIE 7-12 of this condition by setting the EXT of the CIE 7-12. The NCU 7-10 then suspends operation by waiting for its EXT to be set. The read-to-wait transition is unconditional.

Wait-to-read

The CIE 7-12 determines the type of packet in the input page. If the packet is neither a WT nor a receive/send type, the CIE 7-12 sets the mailbox for read and sets the EXT of the NCU 7-10. The NCU 7-10 then comes out of the wait state and goes into its read mode.

Wait-to-write

The CIE 7-12 determines the type of packet in the input page. If the packet is a WT or a receive/send type, the CIE 7-12 sets the mailbox for the type of write and sets the EXT of the NCU 7-10. The NCU 7-10 then comes out of the wait state and goes into the write state.

Write-to-read

This transition occurs unconditionally after write is complete.

The software modules of the NCU 7-10 are written to correspond to the three states. A functional description of the NCU software modules follows:

Read

The LIU address register is set to the read address given in the mailbox page (FIG. 9). When the nodal logic senses an address word that is equal to the read address, the information word that follows is read into the input page and the B register of the NCU 7-10. The data words are read into sequential locations of the input page until the EOP (all ones) is sensed in the B register by an IF ABT command in the read loop of the NCU 7-10 program. The information word following the EOP is also read. This is the longitudinal parity check (LPC) word. Exit to the read-to-wait routine is then performed wherein the EXT of the CIE 7-12 is set and the wait state is entered by a looping IF EXT instruction.

Wait

This module allows the CIE 7-12 and NCU 7-10 to access the same data pages. The NCU 7-10 dwells in this state until its EXT is set. When an interrupt does occur, the NCU 7-10 examines the mailbox page to determine what type of interrupt has occurred. The possible interrupts are read, write 0, or write 1,2.

Write

If a Write 0 interrupt from the CIE 7-12 has occurred, the NCU 7-10 writes the data words of page 0 with the proper address field indicated on its mailbox page until an EOP character is found. For a Write 1, 2 interrupt, the NCU 7-10 first writes any ACK type packets that may reside on page 1 and then writes the output packet residing on page 2, if any, followed by a write token sent to the next node on the loop.

CIE SOFTWARE MODULES

Figure 12:
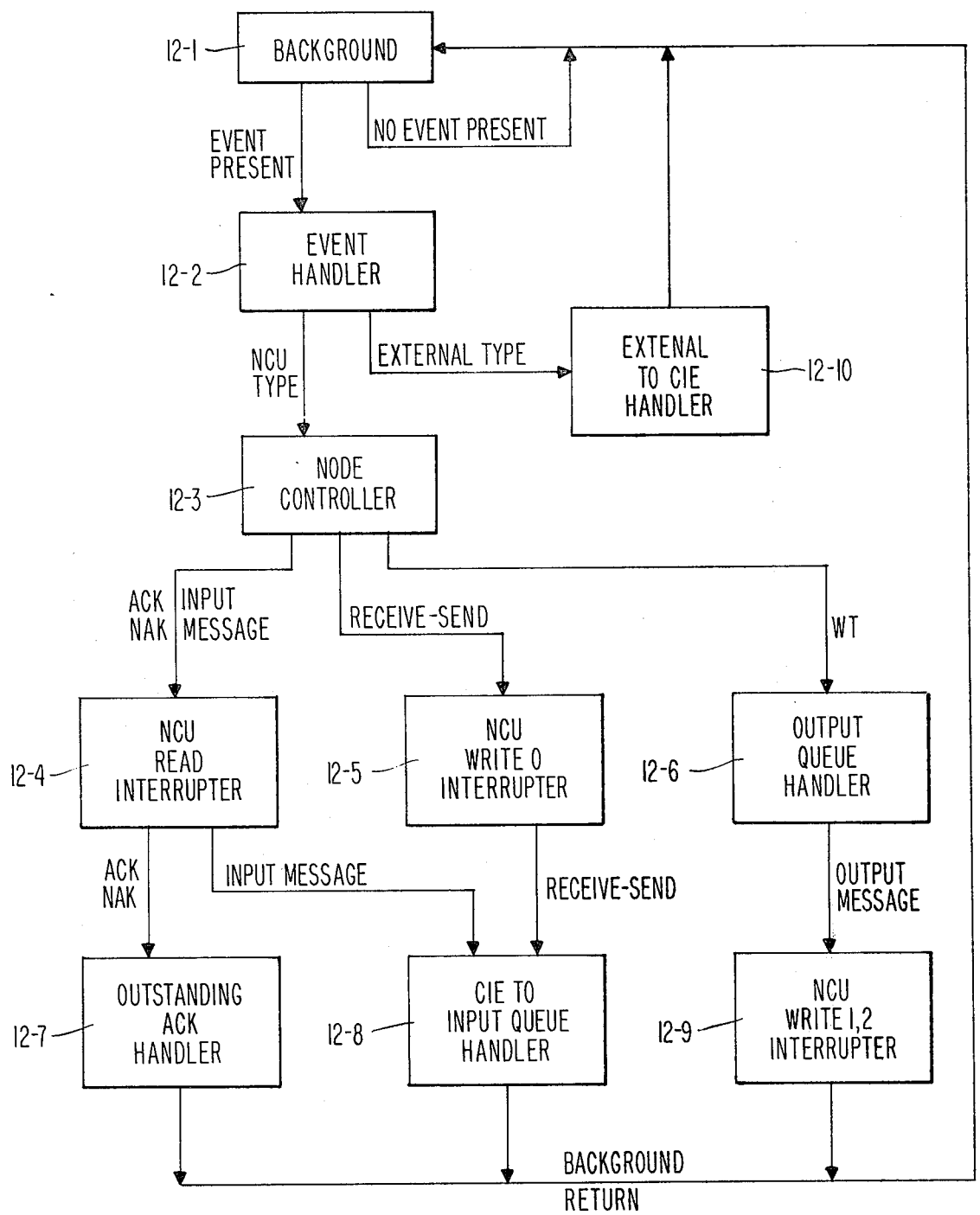
FIG. 12 is a generalized block diagram of the control and interface software used to support the address-directed protocol in the preferred embodiment of the present invention.

The CIE software that implements address-directed protocols is definable as a set of ten modules sequenced as shown in FIG. 12. Modules on the left have higher selection priority than those on the right. This provides the quickest NCU 7-10 wait-to-read transitions which must be performed rapidly to ensure that no message destined for a node is missed owing to late transition to the read state. A short description for each module follows:

Background Module 12-1

The CIE 7-12 scans the events that are to be processed. If none is present, the CIE 7-12 looks for an empty external input buffer (for transfer of data to external equipment—such as host 7-14 or in the case of gateway nodes another CIE). It loads the external buffer from input queue if a packet is present. It looks for an EXT interrupt from buffer. It also handles the generation of new WT's and checks packets in the output queue for timeout.

Event Handler 12-2

From the events that are present, one is selected. An NCU event is chosen before an external (host or gateway) event. If the event is an NCU type then the node controller 12-3 is called; else the external CIE handler 12-10 is called.

Node Controller 12-3

An NCU event occurs only upon completion of an NCU read-to-wait transition. The node controller 12-3 moves the packet on page 0 to an empty page in CIE memory and links the page to input queue. The header is then examined. For ACK, NAK or input messages the NCU read interrupter 12-4 is started immediately with one exception; namely, if the message is a nodal control message. In that case, one of the following is performed first.

Write mailbox to change hardware address;
Change logical-ID/functional address table;
Use alternate route handling for ACK/NAK;
Write mailbox to change WT address;
Modify begin word location on workpage.

If the input packet is of the receive/send type then the NCU write 0 interrupter 12-5 is started. If the input packet is a WT then the output queue handler 12-6 is started.

NCU Read Interrupter 12-4

The read mailbox is set and the EXT of the NCU is set to cause a wait-to-read transition. For ACK/NAK inputs, the outstanding ACK handler 12-7 is called; else the CIE to input queue handler 12-8 is called. If the node is a gateway node, ACK/NAK inputs are treated as regular input messages destined for another loop.

NCU Write 0 Interrupter 12-5

The write 0 mailbox is set and the EXT of the NCU is set to cause a wait-to-write transition. The CIE to input queue handler 12-8 is then called. Thus a receive/send message is treated as both an input and an output message.

Output Queue Handler 12-6

After a WT has been received, all extant output ACK/NAK messages are moved to the mailbox. An output message (if any) is then delinked from and moved to the NCU page 2. The NCU write 1, 2 interrupter 12-9 is then called.

Outstanding ACK Handler 12-7

An ACK received is paired to a packet previously written to the line and the packet page is marked available. A NAK received is paired to a previously written page and the page is relinked to the output queue for retransmission. At the end of the outstanding ACK module 12-7, return to the background module 12-1 is performed.

CIE to Input Queue Handler 12-8

All input packets are handled by this module except ACK/NAK packets received at local nodes and WT packets. Input message and receive/send packets are checked for parity. If parity checks, the packet is linked to input queue and an ACK is added to the extant output ACK/NAK list. If parity does not check, the packet is marked null and a NAK is added to the extant ACK/NAK list. The background module 12-1 is then called.

NCU Write 1, 2 Interrupter 12-9

The write 1, 2 mailbox is set. The destination for WT and the output message write address are set into the mailbox. The EXT of the NCU is then set, and the background handler 12-1 is called.

External to CIE Handler 12-10

If an external to CIE event exists, the CIE transfers the content of the CIE buffer to the output queue for messages and the CIE buffer is marked empty. In gateway nodes, ACK/NAK packets may also be sent across the external interface. When received, such ACK/NAK messages are placed in the extant ACK/NAK list for transfer to the NCU 7-10 at the next used output queue handler 12-6. The background module 12-1 is then called.

In addition to the above modules, a data memory loader module is responsible for initializing data memory during system start-up time.

Having shown and described the preferred embodiment of the present invention, those skilled in the art will realize that various omissions, substitutions and changes in forms and details may be made without departing from the spirit of the invention. It is the intention, therefore, to be limited only as indicated by the scope of the following claims.

What is claimed is:

1. A method of transmitting data from a first station of a communications system to a second station of said communications system, said communications system including a plurality of interconnected communications loops, each of said loops including a ring-connected set of nodes providing data flow unidirectionally from one node to the next, each of said nodes being capable of passing data through itself along its loop, extracting data from its loop or injecting data into its loop, a first subset of each of said loop's set of nodes being local nodes which interface a station to said loop, a second subset of each of said loop's set of nodes being gateway nodes which interface to another of said gateway nodes, each of said stations having associated with it a logical address unique within said communications system, each of said nodes having associated with it a functional address unique within each of said node's respective loop, said method of comprising the steps of:

a. translating the logical address of said second station into a second station functional address, said second station functional address specifying the functional address of the local node j to which said second station interfaces if said local node j is on the same loop as the local node i to which said first station interfaces, otherwise said second station functional address specifying the functional address of a gateway node r on the loop node i is on;

a (1). forming a packet of data at the local node i, said packet including an address field and at least one information field, said address field including said second station functional address, said information fields including the logical address of said second station;

b. transmitting to the loop connected to the current packet forming node said formed packet;

c. receiving said formed packet at the node on said loop downline from the current transmitting node;

d. accepting said received packet at said receiving node if the received packet's second station functional address matches the functional address associated with said receiving node and said receiving node is a local node;

e. if the received packet's second station functional address matches the functional address of the receiving node and the receiving node is one of said loops gateway nodes, transmitting the information fields of said received packet to the gateway node connected to said receiving node and h. receiving the information fields of said received packet at the gateway node connected to said receiving node, h (1). translating the received information field corresponding to the logical address of said second station into a corresponding functional address, said corresponding functional address specifying the functional address of the local node j to which said second station interfaces if said local node j is on the same loop as said connected gateway node, otherwise said corresponding functional address specifying the functional address of one of said gateway nodes on the loop connected to said connected gateway node, i. forming a second packet at the connected gateway node, said second packet including an address field and at least one information field, the address field of said second packet including as its second station functional address the corresponding functional address, the information fields of said second packet including the logical address of said second station, and j. repeating steps b through f; and f. repeating steps b through e if the received packet's functional address does not match the functional address of the receiving node.

2. The method in accordance with claim 1 wherein said packet formed in said step a and said packet formed in said step i each includes at least a second information field, said second information field specifying the logical address of said first station.

3. The method in accordance with claim 2 wherein step d further includes the steps of:

l. translating the received information field corresponding to the logical address of said first station into a third corresponding functional address, said third corresponding functional address specifying the functional address of said local node i if said local node j is on the same loop as said local node i, otherwise said third corresponding functional address specifying the functional address of a gateway node s on the same loop as said local node j;

l (1). forming a third packet at the local node j, said third packet including an address field and a plurality of information fields, said third packet's address field including as its second station functional address the third corresponding functional address, said third packet's information fields specifying at least the logical address of said first station, the logical address of said second station and an indication that the packet of data transmitted by said first station was received by the second station; and m. repeating steps b through f.

4. The method in accordance with claim 3 further including the step of:

o. node i waiting for a predetermined period of time to receive said third packet from said node j acknowledging that the packet transmitted from said first station to said second station was received, said predetermined period commencing with the transmission of the packet formed in said step a.

5. The method in accordance with claim 4 wherein step o further includes the step of:

p. in the absence of said node i receiving said third packet within said predetermined period of time, returning to step b.

6. The method in accordance with claim 1 wherein step d further includes the steps of:

r. node j performing a longitudinal parity check on at least one information field of said received packet;

r (1). translating the received information field corresponding to the logical address of said first station into a sixth corresponding functional address, said sixth corresponding functional address specifying the functional address of said local node i if said local node j is on the same loop as said local node i, otherwise said sixth corresponding functional address specifying the functional address of a gateway node s on the same loop as said second station;

s. forming a sixth packet at the local node j, said sixth packet including an address field and a plurality of information fields, said sixth packet's address field including as its second station functional address the sixth corresponding functional address, said sixth packet's information fields specifying at least the logical address of said first station, the logical address of said second station and an indication of the result of said longitudinal parity check; and returning to step b.

7. The method in accordance with claim 6 wherein step s further includes the step of:
   t. node i waiting for a predetermined period of time to receive said sixth packet from said node j, said predetermined period commencing with the transmission of the packet formed in said step a.

8. The method in accordance with claim 7 wherein step t further includes the step of:
   u. upon receipt of said sixth packet by said node i and in response to said sixth packet indicating an incorrect longitudinal parity check, returning to step b.

9. A method of transmitting data from a first station of a communications system to a second station of said communications system, said communications system including a plurality of interconnected communications loops, each of said loops including a ring-connected set of nodes providing data flow unidirectionally from one node to the next, each of said nodes being capable of passing data through itself along its loop, extracting data from its loop or injecting data into its loop, a first subset of each of said loop's set of nodes being local nodes which interface a station to said loop, a second subset of each of said loop's set of nodes being gateway nodes which interface to a gateway node of another of said plurality of loops, each of said stations having associated with it a logical address unique within said communications system, each of said nodes having associated with it a functional address unique within each of said node's respective loop, said method comprising the steps of:
   a. forming a packet of data at the local node i of the loop to which said first station interfaces, said packet including an address field and at least one information field, said address field specifying the functional address of the local node j to which said second station interfaces if said local node j is on the same loop as said local node i, otherwise said address field specifying the functional address of a gateway node r on the loop node i is on, said information fields including the logical address of said second station;
   b. transmitting to the loop connected to the current packet forming node said formed packet;
   c. receiving said formed packet at the node on said loop downline from the current transmitting node;
   d. if the received packet's functional address matches the functional address associated with said receiving node and said receiving node is a local node,
   d (1). accepting said received packet at said receiving node,
   d (2). node i waiting for a predetermined period of time to receive a third packet from said node j acknowledging that the packet transmitted from said first station to said second station was received,
   d (3). in the absence of said node i receiving said third packet within said predetermined period of time, forming a fifth packet at said node i, said fifth packet including an address field and a plurality of information fields, said fifth packet's address field specifying the functional address of one of said nodes on the loop that said node i is on that provides an alternate path to said node j, said fifth packet's information fields specifying at least the logical addresses of said second station and an indication that an alternate path is being utilized, and
   d (4). returning to step b;
   e. if the received packet's functional address matches the functional address of the receiving node and the receiving node is one of said loop's gateway nodes, transmitting the information fields of said received packet to the gateway node connected to said receiving node; and
   f. if the received packet's functional address does not match the functional address of the receiving node, returning to step b.

10. The method in accordance with claim 9 wherein step e further includes the steps of:
    h. receiving the information fields of said received packet at the gateway node connected to said receiving node;
    i. forming a second packet at the connected gateway node utilizing the received information fields, the address field of said second packet specifying the functional address of the local node j to which said second station interfaces if said local node j is on the same loop as said connected gateway node, otherwise the address field of said second packet specifying the functional address of one of said gateway nodes on the loop connected to said connected gateway node; and
    j. returning to step b.

11. The method in accordance with claim 10 wherein said packet formed in step a and said second packet formed in step i each includes as part of its information fields the logical address of said first station, and said step d (1) includes the additional steps of:
    l. forming a third packet at the local node j, said third packet including an address field and a plurality of information fields, said third packet's address field specifying the functional address of said local node i if said local node j is on the same loop as said local node i, otherwise said third packet's address field specifying the functional address of a gateway node s on the same loop as said local node j, said third packet's information fields specifying at least the logical address of said first station, the logical address of said second station and an indication that the packet of data transmitted by said first station was received by the second station; and
    m. returning to step b.

12. A method of transmitting data from a first station of a communications system to a second station of said communications system, said communications system including a plurality of interconnected communications loops, each of said loops including a ring-connected set of nodes providing data flow unidirectionally from one node to the next, each of said nodes being capable of passing data through itself along its loop, extracting data from its loop or injecting data into its loop, a first subset of each of said loop's set of nodes being local nodes which interface a station to said loop, a second subset of each of said loop's set of nodes being gateway nodes which interface to a gateway node of another of said plurality of loops, each of said stations having associated with it a logical address unique within said communications system, each of said nodes having associated with it a functional address unique within each of said node's respective loop, said method comprising the steps of;

a. forming a packet of data at the local node i to which said first station interfaces, said packet including an address field and at least one information field, said address field specifying the functional address of the local node j to which said second station interfaces if said local node j is on the same loop as said local node i, otherwise said address field specifying the functional address of a gateway node r on the loop node i is on, said information fields including the logical address of said first and second stations;

b. transmitting to the loop connected to the current packet forming node said formed packet;

c. receiving said formed packet at the node on said loop downline from the current transmitting node;

d. if the received packet's functional address matches the functional address associated with said receiving node and said receiving node is a local node, accepting said received packet at said receiving node, and d (1). determining whether the received packet included an information field indicating that alternate routing was used for transmitting said received packet from said first station to said second station;

e. if the received packet's functional address matches the functional address of the receiving node and the receiving node is one of said loop's gateway nodes, transmitting the information fields of said received packet to the gateway node connected to said receiving node; and f. returning to step b if the received packet's functional address does not match the functional address of the receiving node.

13. The method in accordance with claim 12 wherein said substep d (1) further includes the step of:

responding to said received packet indicating that alternate routing was utilized by forming a fourth packet at the local node j, said fourth packet including an address field and a plurality of information fields, said fourth packet's address field specifying the functional address of a node on the loop that said node j is connected to that provides an alternate path to said node i, said fourth packet's information field specifying at least the logical address of said first station, the logical address of said second station, an indication that the packet of data transmitted by said first station was received by said second station, and an indication that alternate routing is being used; and returning to step b.

14. The method in accordance with claim 12 or 13 wherein step e further includes the steps of:

h. receiving the information fields of said received packet at the gateway node connected to said receiving node;

i. forming a second packet at the connected gateway node utilizing the received information fields, the address field of said second packet specifying the functional address of the local node j to which said second station interfaces if said local node j is on the same loop as said connected gateway node, otherwise the address field of said second packet specifying the functional address of one of said gateway nodes on the loop connected to said connected gateway node; and j. returning to step b.

15. The method in accordance with claim 14 wherein step d further includes the following steps prior to step e:

l. forming a third packet at the local node j, said third packet including an address field and a plurality of information fields, said third packet's address field specifying the functional address of said local node i if said local node j is on the same loop as said local node i, otherwise said third packet's address field specifying the functional address of a gateway node s on the same loop as said local node j, said third packet's information fields specifying at least the logical address of said first station, the logical address of said second station and an indication that the packet of data transmitted by said first station was received by the second station; and m. returning to step b.

16. A method of transmitting data from a first station of a communications system to a second station of said communications system, said communications system including a plurality of interconnected communications loops, each of said loops including a ring-connected set of nodes providing data flow unidirectionally from one node to the next, each of said nodes being capable of passing data through itself along its loop, extracting data from its loop or injecting data into its loop, a first subset of each of said loop's set of nodes being local nodes which interface a station to said loop, a second subset of each of said loop's set of nodes being gateway nodes which interface to a gateway node of another of said plurality of loops, each of said stations having associated with it a logical address unique within said communications system, each of said nodes having associated with it a functional address unique within each of said node's respective loop, said method comprising the steps of:

a. forming a packet of data at the local node i of the loop to which said first station interfaces, said packet including an address field and at least one information field, said address field specifying the functional address of the local node j to which said second station interfaces if said local node j is on the same loop as said local node i, otherwise said address field specifying the functional address of a gateway node r on the loop node i is on, said information fields including the logical address of said second station;

b. transmitting to the loop connected to the current packet forming node said formed packet;

c. receiving said formed packet at the node on said loop downline from the current transmitting node;

d. if the received packet's functional address matches the functional address associated with said receiving node and said receiving node is a local node, accepting said received packet at said receiving node and d (1). determining whether the received packet included an information field indicating that alternate routing was used for transmitting said received packet from said first station to said second station;

d (2). forming a third packet at the local node j, said third packet including an address field and a plurality of information fields, said third packet's address field specifying the functional address of said local node i if said local node j is on the same loop as said local node i, otherwise said third packet's address field specifying the functional address of a gateway node s on the same loop as said local node j, said third packet's information fields specifying at least the logical address of said first station, the logical address of said second station and an indication that the packet of data transmitted by said first station was received by the second station, and d (3). returning to step b;

e. if the received packet's functional address matches the functional address of the receiving node and the receiving node is one of said loop's gateway nodes, transmitting the information fields of said received packet to the gateway node connected to said receiving node, and e (1). receiving the information fields of said received packet at the gatway node connected to said receiving node;

e (2). forming a second packet at the connected gateway node utilizing the received information fields, the address field of said second packet specifying the functional address of the local node j to which said second station interfaces if said local node j is on the same loop as said connected gateway node, otherwise the address field of said second packet specifying the functional address of one of said gateway nodes on the loop connected to said connected gateway node, and e (3). returning to step b; and f. returning to step b if the received packet's functional address does not match the functional address of the receiving node.

17. The method in accordance with claim 16 wherein said step d (1) further includes the steps of:

responding to said received packet indicating that alternate routing was utilized by forming a fourth packet at the local node j, said fourth packet including an address field and a plurality of information fields, said fourth packet's address field specifying the functional address of a node on the loop that said node j is connected to that provides an alternate path to said node i, said fourth packet's information field specifying at least the logical address of said first station, the logical address of said second station, an indication that the packet of data transmitted by said first station was received by said second station, and an indication that alternate routing is being used; and returning to step b.

18. A method of transmitting data from a first station of a communications system to a second station of said communications system, said communications system including a plurality of interconnected communications loops, each of said loops including a ring-connected set of nodes providing data flow unidirectionally from one node to the next, each of said nodes being capable of passing data through itself along its loop, extracting data from its loop or injecting data into its loop, a first subset of each of said loop's set of nodes being local nodes which interface a station to said loop, a second subset of each of said loop's set of nodes being gateway nodes which interface to a gateway node of another of said plurality of loops, each of said stations having associated with it a logical address unique within said communications system, each of said nodes having associated with it a functional address unique within each of said node's respective loop, said method comprising the steps of:

a. forming a packet of data at the local node i of the loop to which said first station interfaces, said packet including an address field and at least one information field, said address field specifying the functional address of the local node j to which said second station interfaces if said local node j is on the same loop as said local node i, otherwise said address field specifying the functional address of a gateway node r on said loop node i is on, said information fields including the logical address of said second station;

b. transmitting to the loop connected to the current packet forming node said formed packet;

c. receiving said formed packet at the node on said loop downline from the current transmitting node;

d. if the received packet's functional address matches the functional address associated with said receiving node and said receiving node is a local node, accepting said received packet at said receiving node and d (1). node j performing a longitudinal parity check on at least one information field of said received packet, d (2). forming a sixth packet at the local node j, said sixth packet including an address field and a plurality of information fields, said sixth packet's address field specifying the functional address of said local node i if said local node j is on the same loop as said local node i, otherwise said sixth packet's address field specifying the functional address of a gateway node's on the same loop as said second station, said information fields specifying at least the logical address of said first station, the logical address of said second station and an indication of the result of said longitudinal parity check, d (3). node i waiting for a predetermined period of time after transmitting the packet formed in said step a to receive said sixth packet from said node j, d (4). upon receipt of said sixth packet by said node i and in response to said sixth packet indicating an incorrect longitudinal parity check, forming a seventh packet at said node i, said seventh packet including an address field and a plurality of information fields, said seventh packet's address field specifying the functional address of one of the nodes on the loop that said node i is on that provides an alternate path to said node j, said seventh packet's information fields specifying at least the logical address of said second station and an indication that an alternate path is being utilized, and d (5). returning to step b;

e. if the received packet's functional address matches the functional address of the receiving node and the receiving node is one of said loop's gateway nodes, transmitting the information fields of said received packet to the gateway node connected to said receiving node; and f. returning to step b if the received packet's functional address does not match the functional address of the receiving node.

19. The method in accordance with claim 18 wherein step e further includes the steps of:

h. receiving the information fields of said received packet at the gateway node connected to said receiving node;

i. forming a second packet at the connected gateway node utilizing the received information fields, the address field of said second packet specifying the functional address of the local node j to which said second station interfaces if said local node j is on the same loop as said connected gateway node, otherwise the address field of said second packet specifying the functional address of one of said gateway nodes on the loop connected to said connected gateway node; and j. returning to step b.

20. A communications system for routing packets of data from any first of a plurality of stations to any second other of said plurality of stations, each of said plurality of stations having associated with it a logical address unique within said communications system, said communications system comprising:

a plurality of communications loops, each of said plurality of communications loops for circulating data; and a plurality of sets of nodal means, each of said sets of nodal means connected to one of said plurality of communications loops, each of said nodal means having associated with it a functional address unique within its respective set of nodal means, each of said nodal means for passing data through itself along its respective loops, extracting data from its respective loop and injecting data into its respective loop, each of said nodal means further including means for translating a logical address into a corresponding functional address, the corresponding functional address identifying a nodal means providing a route to the station with the respective logical address, each of said logical address translating means including translation table means providing primary and alternate routing information for an associated subset of said plurality of logical addresses, a first subset of each of said sets of nodal means being further characterized as local nodal means, each of said local nodal means for interfacing one of said plurality of stations to that local nodal means respective loop, and a second subset of each of said sets of nodal means being further characterized as gateway nodal means, each of said gateway nodal means for transferring data between its respective loop and another of said gateway nodal means.

21. The communications system in accordance with claim 20 wherein each of said translation table means includes an address translation table for storing said primary and said secondary routing information for each one of said associated subset of logical addresses, said primary routing information providing the functional address of the local nodal means to which said one of said associated subset of logical addresses corresponds if that local nodal means is on the same loop as said respective translating means, otherwise said primary routing information providing the functional address of one of said gateway nodal means that provides a route to the local nodal means to which said one of said associated subset of logical addresses corresponds, the gateway means whose functional address is specified being on the same loop as said respective translating means.

22. The communications system in accordance with claim 21 wherein each of said local nodal means includes means for receiving data from its respective station, means for forming a packet from said received data and means for transmitting said formed packet of data onto its respective loop, said packet formed from said received data including:

at least one address field, one of said address fields specifying the primary functional address specified in that said local nodal means address translation table for the logical address of the second station; and at least one information field, one of said information fields specifying the logical address of said second station.

23. The communications system in accordance with claim 22 wherein each of said local nodal means further includes means, responsive to the receipt of a packet of data from its respective loop, said means for:

retransmitting said received packet of data onto its respective loop if the received packet's functional address is different than the functional address associated with said local nodal means; and accepting said received packet of data if the received packet's functional address is the same as that associated with said local nodal means.

24. The communications system in accordance with claim 23 wherein each of said packets formed from said received data and each of said third packets formed by said gateway nodal means further includes at least a second information field, said second information field specifying the logical address of said first station.

25. The communications system in accordance with claim 24 wherein each of said local nodal means further includes means responsive to the acceptance of a received packet of data, said means for forming an acknowledgment packet and transmitting said acknowledgment packet to its respective loop, said acknowledgment packet including an address field and at least three information fields, said address field specifying the primary functional address specified in said local nodal means address translation table and corresponding to the logical address of said first station as specified in one of said information fields of said accepted packet; and said information fields including the logical address of said first and second stations and an indication that the packet transmitted by the first station was received by the second station.

26. The communications system in accordance with claim 20 wherein said other of said gateway nodal means is connected to one of said plurality of communications loops other than said respective loop.

27. The communications system in acordance with claim 22 wherein each of said gateway nodal means further includes means, responsive to the receipt of a packet of data from its respective loop, said means for:

retransmitting said received packet of data onto its respective loop if the functional address in said received packet's address field is different than the functional address associated with said receiving gateway nodal means; and transmitting the information fields contained in said received packet to the connected gateway nodal means if the functional address in said received packet's address field is the same as that associated with said receiving gateway nodal means.

28. The communications system in accordance with claim 27 wherein each of said gateway nodal means further includes means, responsive to the receipt of said information fields from one of said receiving gateway nodal means, said means for forming a third packet of data and transmitting said third packet of data onto its respective loop, said third packet including an address field and at least one information field, the address field of said third packet including the primary functional address specified in said gateway nodal means address translation table and corresponding to the logical address of said second station specified in one of said received information fields, one information field of said third packet including the logical adddress of said second station.

29. The communications system in accordance with claim 22 wherein the local nodal means connecting said first station to its respective loop further includes detection means, responsive to not receiving an acknowledgment packet from said second station within a predetermined time after transmitting said packet to said second station, said detection means for forming a second packet of data and transmitting said second packet onto its respective loop, said second packet including at least one address field, said second packet's address field specifying the functional address of one of said nodal means on the loop that said first station is on that provides an alternate path to the local nodal means connecting said second station to said communications system.

30. The communications system in accordance with claim 29 wherein said second packet further includes information fields specifying the logical address of said second station and an indication that an alternate path is being utilized.

31. The communications system in accordance with claim 30 wherein said second packet further includes an additional information field specifying the logical address of said first station.

32. The communications system in accordance with claim 29 wherein said detection means is responsive to said respective local nodal means address translation table, said respective local nodal means address translation table providing the functional address of the nodal means providing an alternate path to said second station.

33. The communications system in accordance with claim 20 or 22 further characterized in that the set of nodal means connected to one of said plurality of communications loops is the only said set of nodal means connected to that one of said plurality of communications loops.

34. A communications system for routing packets of data from any first of a plurality of stations to any second other of said plurality of stations, each of said plurality of stations having associated with it a logical address unique within said communications system, said communications system comprising:
a plurality of communications loops, each of said plurality of communications loops for circulating data; and
a plurality of sets of nodal means, each of said sets of nodal means connected to one of said plurality of communications loops, each of said nodal means having associated with it a functional address unique within its respective set of nodal means, each of said nodal means for passing data through itself along its respective loop, extracting data from its respective loop and injecting data into its respective loop,
a first subset of each of said sets of nodal means being further characterized as local nodal means, each of said local nodal means for interfacing one of said plurality of stations to that local nodal means respective loop, and
a second subset of each of said sets of nodal means being further characterized as gateway nodal means, each of said gateway nodal means for transferring data between its respective loop and another of said gateway nodal means,
each of said local nodal means including means for receiving data from its respective station, means for forming a packet from said received data and means for transmitting said formed packet of data onto its respective loop, wherein said packet formed from said received data includes at least one address field and at least one information field, said address field specifying and functional address of one of the nodal means on its respective loop that provides a first path to the local nodal means j to which said second station interfaces, one of said information fields specifying the logical address of said second station,
each of said local nodal means further including detection means, responsive to not receiving an acknowledgment packet from said second station with a predetermined time after transmitting a packet to said second station, said detection means for forming a second packet of data and transmitting said second packet onto its respective loop, said second packet including at least one address field, said second packet's address field specifying the functional address of one of said nodal means on the loop that said first station is on that provides an alternate path to the local nodal means j to which said second station interfaces.

35. The communications system in accordance with claim 34 wherein the address field of the packet foemed from said received data is more particularly characterized as specifying the functional address associated with the local nodal means j to which said second station interfaces if said local nodal means j is on the same one of said loops as the local nodal means i connecting said first station to said communications system, otherwise said address field specifying the functional address of one of said gateway nodal means on the same one of said loops as said local nodal means i.

36. The communications system in accordance with claim 35 wherein said second packet further including information fields specifying the logical addresses of said first and second stations and an indication that an alternate path is being taken.

37. The communications system in accordance with claim 34 wherein each of said local nodal means further includes means, responsive to the receipt of a packet of data from its respective loop, said means for:
retransmitting said received packet of data onto its respective loop if the received packet's address field is different than the functional address associated with said local nodal means; and
accepting said received packet of data if the received packet's address field specifies the same address as the functional address associated with said local nodal means.

38. The communications system accordance with claim 34 or 37 wherein each of said gateway nodal means further includes means, responsive to the receipt of a packet of data from its respective loop, said means for:
retransmitting said received packet of data onto its respective loop if the functional address specified in the received packet's address field is different than the functional address associated with said receiving gateway nodal means; and
transmitting the information fields contained in said received packet to the connected gateway nodal means if the functional address specified in the received packket's address field is the same as that associated with said receiving gateway nodal means.

39. The communications system in accordance with claim 38 wherein each of said gateway nodal means further includes means, responsive to the receipt of said information fields from said receiving gateway nodal means, said means for forming a third packet of data and transmitting said third packet of data onto its respective loop, said third packet including an address field and at least one information field, the address field of said third packet formed responsive to the logical address of said second station specified in one of said received information fields.

40. The communications system in accordance with claim 34 wherein:
   said means for forming a packet from said received data includes conversion means, said conversion means for providing the functional address of the nodal means providing a path to said second station; and
   said means for forming said second packet includes second conversion means, said second conversion means for providing the functional address of the nodal means providing an alternate path to said second station.

41. The communications system in accordance with claim 34 or 37 or 40 wherein said other of said gateway nodal means is connected to one of said plurality of communication loops other than said respective loop.

* * * * *

UNITED STATES PATENT AND TRADEMARK OFFICE
CERTIFICATE OF CORRECTION

PATENT NO. : 4,287,592

DATED : September 1, 1981

INVENTOR(S) : Daniel J. Paulish, et al.

It is certified that error appears in the above-identified patent and that said Letters Patent are hereby corrected as shown below:

At column 17, line 21, delete the first occurrence of the word "of".
At column 18, line 7, change "repeating steps b through f" to --returning to step b--.
At column 24, line 28, change "node's" to --node s--.
At column 25, line 61, change "claim 21" to --claim 21 or 26--.
At column 26, line 46, change "22" to --26--.
At column 27, line 7, change "22" to --26--.
At column 27, line 38, change "22" to --26 or 34--.
At column 28, line 19, change "with" to --within--.
At column 28, line 30, change "foemed" to --formed--.
At column 28, line 41, change "including" to --includes--.

Signed and Sealed this

Eighth Day of December 1981

[SEAL]

Attest:

GERALD J. MOSSINGHOFF

*Attesting Officer*     *Commissioner of Patents and Trademarks*